United States Patent [19]

Peter et al.

[11] Patent Number: 4,913,602
[45] Date of Patent: Apr. 3, 1990

[54] APPARATUS FOR THE FINE ADJUSTMENT OF A TOOL FOR A ROTATING RADIAL ADJUSTING HEAD

[75] Inventors: Hans-Jürgen Peter, Grossen-Linden; Wilfried Gerk, Rödermark, both of Fed. Rep. of Germany

[73] Assignee: Samson AG, Frankfurt, Fed. Rep. of Germany

[21] Appl. No.: 227,510

[22] Filed: Aug. 2, 1988

[30] Foreign Application Priority Data

Aug. 7, 1987 [DE] Fed. Rep. of Germany ....... 3726276

[51] Int. Cl.$^4$ ...................... B23B 47/22; B23B 29/034
[52] U.S. Cl. ...................................... 408/147; 82/1.2; 82/133; 60/588
[58] Field of Search ................. 82/1.2, 1.4, 2 B, 21 A; 60/588; 408/147

[56] References Cited

U.S. PATENT DOCUMENTS

| 2,060,846 | 11/1936 | Bowen | 60/588 |
| 3,500,641 | 3/1970 | Meekings | 60/588 |
| 3,513,656 | 5/1970 | Engle | 60/588 |
| 3,824,883 | 7/1974 | Wloszek | 82/1.2 |
| 4,224,846 | 9/1980 | Eysel et al. | 82/1.2 |
| 4,412,465 | 11/1983 | Wright | 82/1.2 |
| 4,422,294 | 12/1983 | Klein | 60/588 |
| 4,644,848 | 2/1987 | McKendrick | 91/419 |

Primary Examiner—Frederick R. Schmidt
Assistant Examiner—William E. Terrell
Attorney, Agent, or Firm—Toren, McGeady & Associates

[57] ABSTRACT

An apparatus for the fine radial adjustment of a turning tool of a rotating cutter head with a first converter for converting a low pneumatic control pressure into a fluid pressure and with a further pressure converter for converting the intermediate pressure into a high working pressure for acting upon an adjusting medium, adjusts a turning tool. The first converter is stationary outside of the rotating head and is connected to the second converter, which is disposed in the rotating head, over a connection of conduits providing a rotary transmission for pressure transformation. The intermediate pressure is set higher than the control pressure, but lower than the adjusting pressure for unloading the rotary transmission.

7 Claims, 1 Drawing Sheet

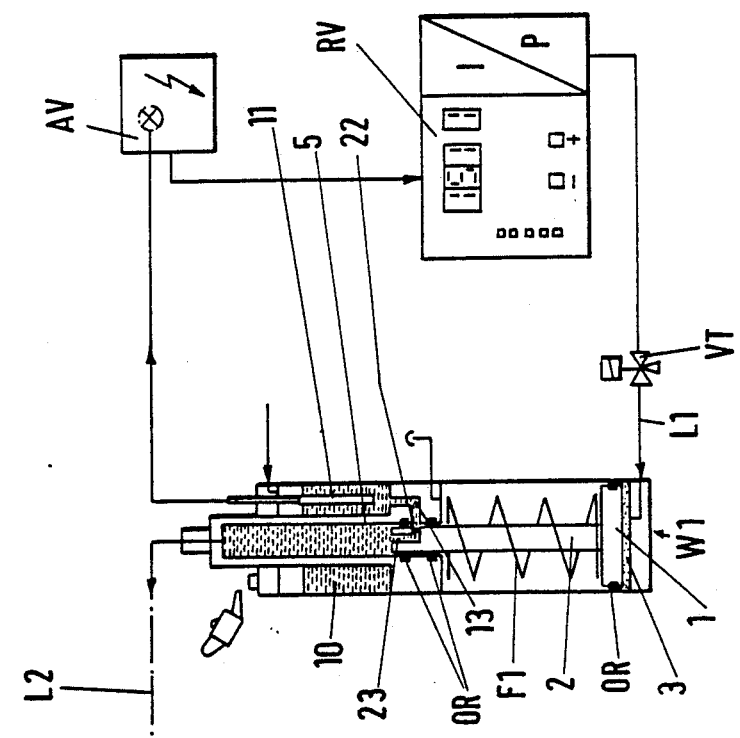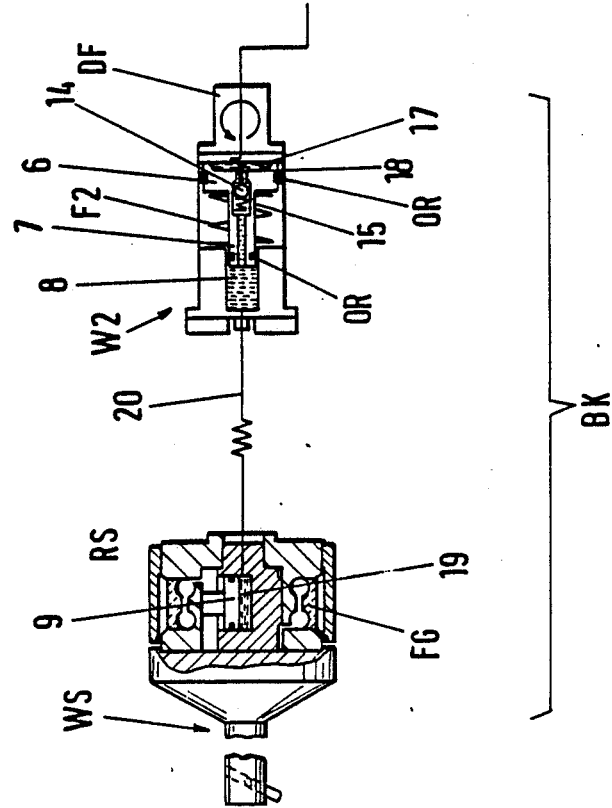

APPARATUS FOR THE FINE ADJUSTMENT OF A TOOL FOR A ROTATING RADIAL ADJUSTING HEAD

FIELD AND BACKGROUND OF THE INVENTION

The present invention relates in general to radially adjustable cutting tools, and in particular to a new and useful apparatus for the fine adjustment of the cutting edge of a tool mounted in a rotating radial adjusting head.

Known boring heads are used preferably for the treatment or cutting of hollow cylinder surfaces with a cutting edge of a tool that is radially adjustable with reference to the axis of rotation of the boring head. The tool is adjusted by means of hydraulic pressure. The boring head generally includes a radial adjusting head which provides a stiff parallel spring joint for guiding the turning tool, which comprises the cutting edge of the tool. The stiff parallel spring joint can be defected radially by small amounts by means of a piston or by means of an expansion element. A pneumatic control pressure (generally an air pressure) is transformed into a higher hydraulic working pressure which is applied, as an adjusting pressure to the adjusting member, over a pressure intensifier which is assigned to the boring head. During this operation, pressure oil can be supplied from a storage reservoir if, in the hydraulic arrangement, steering losses occur (see the German patent No. 24 26 409).

In order to compensate losses of waste oil, the piston of the pressure intensifier is retracted at the start of each treatment procedure, so that a vacuum is formed in the area of the pressure oil, which opens a back-pressure-valve, so that the pressure oil in the storage reservoir which possibly is under a slight over-pressure, can flow into the liquid chamber of the pressure intensifier.

Since a rotating system has to be balanced, in the known arrangement the storage reservoir and the back-pressure valve are disposed opposed to each other in relation to the axis of rotation. Nevertheless balance errors occur by reason of the stock of waste oil flowing slowly into the hydraulic pressure system, and balance errors cause oscillations. In addition to this the stock of oil has to be small in order to avoid overly high forces due to inertia, which would disturb the rotation. In order to keep these undesirable effects as small as possible, the arrangement has to be stopped frequently, in order to replenish the supply oil. Furthermore the control air has to be supplied through a rotary seal which has to be lubricated continuously, because otherwise the seal lips can be quickly destroyed at high rates of rotation. If the pressure intensifier and the radial adjusting head should be fashioned as construction elements which are spaced from each other, the pressure oil has to be supplied to the radial adjusting head through a rotary transmission with a rotary sealing as well. This is not very easy to carry out by reason of the high adjusting pressures and the strains of the rotary transmission related to these pressures. The rotary transmission thus is subject to premature wear.

SUMMARY OF THE INVENTION

The present invention provides a further development of the device of fine adjustment which has been mentioned above, in such a way, that the necessary rotary transmission is less strained and that balance errors by reasons of losses of waste oil cannot occur even after a long period of operation.

Accordingly, an object of the present invention is to provide an apparatus for the fine adjustment of a tool on a rotating radial adjusting head which includes a first converter for receiving a relatively low pneumatic control pressure and for supplying an intermediate hydraulic pressure, and a second converter operatively connected to the rotating radial adjusting head for receiving the intermediate hydraulic pressure and supplying a high hydraulic pressure to the head, the first and second converters being connected to each other fluidically, the first converter having a reservoir for replenishing hydraulic fluid in both converters.

According to the invention, the conversion of the control air pressure into the hydraulic adjusting pressure is not carried out directly (meaning one step inside of the rotating radial adjusting head) but a further hydraulic pressure stage is inserted between one adjusting pressure chamber and another adjusting pressure chamber. Through this further hydraulic pressure stage, the conversion of the control air pressure into the intermediate pressure in this additional pressure stage is carried out outside of the radial adjusting head. The pressure fluid of the intermediate pressure stage is lead over a rotary seal to the radial adjusting head as well. Since the intermediate pressure is higher than the control pressure, but lower than the adjusting pressure, which adjusts the cutting edge of the tool, the pressure sensitive rotary transmission is less strained. By reason of the inventive assignment of a storage reservoir to the part of the device which is not revolving, and by reason of a centric connection of fluids from the storage reservoir over the pressure chambers of the pressure converter, which is assigned to the radial adjusting head, all balance errors are prevented at the rotating radial adjusting head. Furthermore stock oil can be refilled by hand, without stopping the installation, as is the case in known arrangements.

Accordingly, a further object of the present invention is to provide an apparatus for the fine adjustment of a turning tool in a rotating radial adjusting head which is simple in design, rugged in construction and economical to manufacture.

The various features of novelty which characterize the invention are pointed out with particularly in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

BRIEF DESCRIPTION OF THE DRAWING

The only FIGURE in the drawing is a schematic sectional view of the apparatus in accordance with the present invention.

DESCRIPTION OF THE PREFERRED EMBODIMENT

As shown in the only FIGURE, the invention comprises two constructional groups, that is a first converter W1 and, a second converter W2 which are connected to a radial adjusting head RS. The converter W2 and the radial adjusting head RS form an integral construction part, referred to collectively as a boring head BK. Furthermore, an indicating device or display AV as well as an electro-pneumatic regulating device or regulator RV are provided, which, since they are not part of the invention, are not described in detail.

The converter W1 comprises a piston arrangement which is composed of a big piston 1 and a small piston 2, which are rigidly or firmly connected to each other.

A pressure chamber 3 is bounded by the big piston 1, and is supplied with control air pressure over a pilot valve VT on an air conduit L1, passing from the regulating device RV. If the control air pressure in the pressure chamber becomes zero, the piston arrangement is lowered by reason of the forces of gravity or by reason of a weak spring F1, which is represented in the FIGURE. As is well known, the regulator RV calculates the controlling air pressure for conduit L1 from a deviation between a desired value and an actual value for the dimensions of a hollow cylinder to be cut by means of the boring head.

Small piston 2 moves in an intermediate pressure cylinder 5 in which pressure oil is situated. When the piston arrangement 1, 2 moves, an intermediate pressure is generated in the intermediate cylinder 5. This pressure depends on the relationship between the front or active surfaces of the big piston 1 and the small piston 2 which act on their respective pressure chambers. The pressure oil, which is under intermediate pressure is lead over a pressure oil conduit L2 and a rotary transmission DF to the converter W2.

The converter W2 comprises a piston arrangement which is composed of a big piston 6 and a firmly connected small piston 7. The small piston 7 rides in a pressure cylinder 8 which is filled with pressure oil and communicates with the pressure chamber 19 of an adjusting piston in the adjusting head RS over a capillary tube 20.

A turning tool WS is moved by the adjusting piston 9. The turning tool WS is stiffly connected to the radial adjusting head RS by a parallel spring joint FG.

The big piston 6 slides in a pressure chamber 17, which, as already mentioned, is connected over the rotary transmission DF and the conduit L2, to the pressure chamber of the intermediate pressure cylinder 5 of the converter W1. A tripping pin 18, attached to the bottom of the pressure chamber 17, projects into a stepped opening of a passage 15 which penetrates the piston arrangement 6, 7 centrically. A spring-loaded back pressure valve 14 is disposed inside this stepped opening of passage 15 and can be opened by contact with the tripping pin 18. The passage 15 opens out, at a reduced diameter portion, at the front surface of the small piston 7, into the pressure chamber of the pressure cylinder 8. A spring F2 keeps the piston arrangement 6, 7 in a position of rest shown in the FIGURE. In this position, chamber 8 and 17 communicate with each other over open valve 14. As the drawing shows, the converter W2 is fashioned to be symmetrical with respect to rotation.

An adjusting pressure can be generated in converter W2, to the relationship between the active cylinder surfaces of the big piston 6 and small piston 7. This adjusting pressure acts upon the adjusting piston 9 of the radial adjusting head RS in the pressure chamber 19. By this means, the turning tool WS, which carries a cutting edge, is adjusted by small amounts according to the preset value or turn control signal of the regulator RV.

As can be concluded from the foregoing, to each control pressure of the regulator RV, a certain adjusting pressure is assigned, within the limits given by the unavoidable friction in the described installation. If this installation loses pressure medium through the seals OR of piston 2, which are indicated in the drawing, the piston arrangement 1, 2 of the pneumatic-hydraulic converter W1 moves up until a condition of equilibrium is reached between the intermediate pressure (in L2) and the control pressure (in L1).

If in the adjusting pressure chamber of the converter W2 there are losses of pressure oil, the piston installation 6, 7 of the pressure converter W2 moves to the left until this loss is compensated.

It can be recognized that no balance errors occur if oil must be added to refill the system, since the intermediate pressure-converter W2, which is fashioned symmetrical with regard to rotation, moves only in the axial direction.

If there is a high loss of pressure medium it is suitable to replenish the pressure oil from a storage reservoir. For this purpose a storage reservoir 10 is provided in the converter W1 for supplying makeup pressure oil for compensation of lost oil. This reservoir 10 is disposed concentric around the pressure cylinder 5.

A sensor in the form of a float switch 11, which is connected to the indicating device AV, projects into the supply of oil in the storage reservoir 10, so that the level of oil can be indicated and a signal sent when the level has fallen below a minimum oil level.

A conduit 13 connects the piston arrangement 1, 2 of the converter W1 with the reservoir 10 through an opening 22 in the mantle surface of the small piston 2, which opens out into the front surface of the small piston 2 over a conduit 23. The area of the mantle surface of the small piston, in which the opening 22 is disposed, is sealed by the seal OR. If the level falls below the minimum oil level, storage oil has to be refilled by hand. This is carried out without stopping the machine.

The functioning of the described installation works as explained in the following. When a treatment or cutting process is started, the piston arrangement 1, 2 of the first converter W1 is lowered by a reduction of the control air pressure. In this position the intermediate pressure chamber is disposed above the conduit connection 13, 22 and 23 with the storage reservoir 10. The piston arrangement 6, 7 of the converter W2 is moved all the way to the right as well, under the influence of the spring F2. In this position the back-pressure valve, fashioned as a ball 14, which is pressed to the right under the influence of the spring, has left its seated position in the big piston 6, since the pin 18, which is attached to the wall of the intermediate pressure space 17 has moved the ball to the left in relation to the drawing. Thus in this condition there is a direct pressure oil connection from the storage reservoir 10 up to the adjusting pressure chamber 19 of the radial adjusting head RS. Pressure oil can thus flow out of the reservoir into the pressure chambers.

If the control pressure is increased over the regulator RV, the piston arrangement 1, 2 of the converter W1 moves up, and the conduit 13 is closed. Thus the intermediate pressure is increased accordingly and moves the piston arrangement 6, 7 of the converter W2 to the left. After moving through a small distance the back-pressure valve 14 is closed as well, since now the ball has lifted up from the tripping pin 18 and thus the full adjusting pressure for the radial adjusting head can be built up. The cutting edge of the tool of the turning tool is adjusted correspondingly in this way.

This procedure is repeated before the start of each cycle of treatment.

Naturally it is possible as well, to provide a back-pressure valve or as other modifications, instead of the described sliding connection between the oil storage reservoir and the intermediate chamber of the converter W1, as long as these modifications do not alter the inventive principles of the subject matter of the described installation.

While a specific embodiment of the invention has been shown and described in detail to illustrate the application of the inventive principles, it will be understood that the invention may be embodied otherwise without departing from such principles.

What is claimed is:

1. An apparatus for fine radial adjustment of a turning tool in a rotating head having a hydraulically operable adjusting member which acts on a stiff parallel spring joint carrying the turning tool, comprising:

first converter means for receiving low pneumatic control pressure and for discharging intermediate hydraulic pressure proportional to the low pneumatic control pressure, said first converter means carrying a hydraulic pressure medium reservoir and a pressure medium conduit communicating said pressure medium reservoir with said intermediate hydraulic pressure in at least one position of said first converter means, said first converter means being arranged so that the conversion from low pneumatic pressure to intermediate hydraulic pressure takes place externally of the rotating head; and second converter means fluidically connected to said first converter means for receiving said intermediate hydraulic pressure, said second converter means being connected to the rotating head for rotation therewith and for supplying high adjusting pressure to the adjusting member, said converter means including a rotary transmission for providing the fluidic connection to the intermediate hydraulic pressure discharge from said first converter means.

2. An apparatus according to claim 1, wherein said first converter means includes a cylinder defining a control pressure chamber and a cylinder defining an intermediate pressure chamber, a big piston slidably mounted in and having a cylinder surface bounding said control pressure chamber, a small piston slidably mounted in and having a cylinder surface bounding said intermediate pressure chamber, said big piston being rigidly connected to said small piston for movement therewith, said reservoir being disposed around said intermediate pressure cylinder, said small piston having a mandrel with an opening therein communicating with said reservoir in a rest position of said small piston, said small piston having an opening in its cylinder surface communicating with said opening in said mandrel of said small piston for supplying medium from said reservoir to said intermediate pressure chamber.

3. An apparatus according to claim 2, wherein said second converter means includes a receiving pressure cylinder defining a receiving a pressure chamber and an adjusting pressure cylinder defining an adjusting pressure chamber, a second big piston slidably mounted in and having a cylinder surface bounding said receiving pressure chamber, a second small piston slidably mounted in and having a cylinder surface bounding said adjusting pressure chamber, a piston rod rigidly connecting said second big and small pistons to each other, said piston rod having a passage therethrough communicating said receiving and adjusting pressure chambers with each other, and a valve in said passage for opening said passage in at least one position of said second big and small pistons, said rotary transmission being connected to said receiving pressure cylinder for passing the intermediate hydraulic pressure to said receiving pressure chamber.

4. An apparatus according to claim 3, including valve operating means in said second converter means for closing said valve in said passage for converting the intermediate hydraulic pressure in said receiving pressure chamber to high adjusting pressure in said adjusting pressure chamber when said big and small pistons of said second converter means move from said at least one position thereof.

5. An apparatus according to claim 4, wherein said valve comprises a spring loaded ball in said passage, said spring loaded ball being biased into a closing position for closing said passage, and a tripping pin connected to said receiving pressure chamber for engaging said spring loaded ball to open said valve and passage when said big and small pistons of said second converter means are in a rest position whereby in said rest position communication is established between said reservoir in said first converter means and said receiving and adjusting pressure chambers in said second converter means.

6. An apparatus according to claim 1, including fluid level sensing means in said reservoir and an indicator connected to said fluid level sensing means for indicating the level of fluid in said reservoir.

7. An apparatus according to claim 1, including biasing means in each of said first and second converter means for biasing said first and second converter means into a rest position whereat communication is established between said reservoir, the intermediate hydraulic pressure and the high adjusting pressure.

* * * * *